(12) United States Patent
Kato

(10) Patent No.: US 9,221,319 B2
(45) Date of Patent: Dec. 29, 2015

(54) CAB FOR CONSTRUCTION MACHINE AND CONSTRUCTION MACHINE

(71) Applicant: KOMATSU LTD., Tokyo (JP)

(72) Inventor: Yasunari Kato, Komatsu (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/003,328

(22) PCT Filed: Mar. 12, 2013

(86) PCT No.: PCT/JP2013/056772
§ 371 (c)(1),
(2) Date: Sep. 5, 2013

(87) PCT Pub. No.: WO2014/128978
PCT Pub. Date: Aug. 28, 2014

(65) Prior Publication Data
US 2014/0239650 A1  Aug. 28, 2014

(30) Foreign Application Priority Data

Feb. 22, 2013 (JP) ................................. 2013-033323

(51) Int. Cl.
*E05B 3/00* (2006.01)
*B60J 5/04* (2006.01)
(Continued)

(52) U.S. Cl.
CPC ............... *B60J 5/0487* (2013.01); *E05B 79/20* (2013.01); *E05B 83/42* (2013.01); *E05B 85/14* (2013.01); *Y10T 292/57* (2015.04)

(58) Field of Classification Search
CPC ......... E05B 85/10; E05B 85/12; E05B 85/14; E05B 85/16; E05B 83/42; E05B 7/00

USPC ................ 292/336.3, 56, 221, 226, DIG. 31, 292/DIG. 37, DIG. 63, 92–94; 16/412; D8/300–303, 306–308; 188/2 D, 24.22; 74/551.1–551.8, 502.2, 489
See application file for complete search history.

(56) References Cited

U.S. PATENT DOCUMENTS 3,663,047 A * 5/1972 Zawadzki ........................ 292/92
3,767,238 A * 10/1973 Zawadzki ........................ 292/21
(Continued)

FOREIGN PATENT DOCUMENTS

CN  1693594 A  11/2005
CN  102086654 A  6/2011
(Continued)

OTHER PUBLICATIONS

Decision to Grant Patent mailed on Jun. 25, 2013 for the corresponding Japanese Application No. 2013-033323 filed Feb. 22, 2013.

*Primary Examiner* — Alyson M Merlino
(74) *Attorney, Agent, or Firm* — Drinker Biddle & Reath LLP

(57) ABSTRACT

A handle is supported by a hollow tube so as to be movable in the direction in which the handle is pushed toward a hollow space. A hole leading to the hollow space of the hollow tube has a first hole portion located at one end of a base portion extending in a longitudinal direction L of the hollow tube and a second hole portion extending from the first hole portion to a portion corresponding to the other end of the base portion in the longitudinal direction L. A dimension $W_{2b}$ of a grip portion of the handle in a width direction W is greater than a dimension $W_{2a}$ of the base portion of the handle in the width direction W and greater than a dimension $W_{1a}$ of the second hole portion in the width direction W.

8 Claims, 6 Drawing Sheets

(51) Int. Cl.
*E05B 79/20* (2014.01)
*E05B 83/42* (2014.01)
*E05B 85/14* (2014.01)
*E05C 9/12* (2006.01)

(56) References Cited

U.S. PATENT DOCUMENTS

| | | | | |
|---|---|---|---|---|
| 4,167,280 | A * | 9/1979 | Godec et al. | 292/92 |
| 5,011,199 | A * | 4/1991 | Lowe et al. | 292/92 |
| 6,419,284 | B1 * | 7/2002 | Kutschat | 292/56 |
| 7,097,216 | B2 * | 8/2006 | Lane et al. | 292/216 |
| 7,111,879 | B2 * | 9/2006 | Zweibohmer et al. | 292/336.3 |
| 7,198,308 | B2 * | 4/2007 | Lane et al. | 292/336.3 |
| 7,309,087 | B2 * | 12/2007 | Lane et al. | 292/216 |
| 8,011,699 | B2 * | 9/2011 | Lane | 292/56 |
| 2005/0212307 | A1 | 9/2005 | Lane et al. | |
| 2009/0091140 | A1 | 4/2009 | Lane | |
| 2010/0045052 | A1 | 2/2010 | Kutschat | |

FOREIGN PATENT DOCUMENTS

| | | | |
|---|---|---|---|
| DE | 19952012 A1 * | 5/2001 | |
| DE | 102005014700 A1 * | 12/2005 | |
| DE | 102008037956 B4 * | 6/2011 | |
| EP | 1096086 A2 * | 5/2001 | |
| GB | 2412942 A * | 10/2005 | |
| GB | 2453408 B * | 2/2012 | |
| JP | S63-28756 U | 2/1988 | |
| JP | 6-10041 Y2 | 3/1994 | |

* cited by examiner (A)

(B)

(A)

(B)

(A)

(B)

(C)

CAB FOR CONSTRUCTION MACHINE AND CONSTRUCTION MACHINE

TECHNICAL FIELD

The present invention relates to a cab for a construction machine and the construction machine, and particularly to a cab for a construction machine, specifically a cab including a door and a door opening and closing mechanism for opening and closing the door; and a construction machine including the cab for a construction machine.

BACKGROUND ART

A door handle of a working vehicle is disclosed in US Patent Application Publication No. 2010/0045052 (PTD 1), for example.

This US Patent Application Publication No. 2010/0045052 discloses a door lock mechanism capable of releasing a door lock by an operator pushing a remote control button provided in a transverse tube from inside a vehicle such as an agricultural machine. Thereby, the operator can push the remote control button into the transverse tube by gripping the remote control button together with the transverse tube. Thus, unlocking of the door and the like can be achieved in a simple operation.

CITATION LIST

Patent Document

PTD 1: US Patent Application Publication No. 2010/0045052

SUMMARY OF INVENTION

Technical Problem

However, according to the above-described door lock mechanism, the operator's finger or palm may get caught in a gap between a hole of the transverse tube and the remote control button pushed into the hole.

The present invention has been made in light of the above-described problems. An object of the present invention is to provide a cab for a construction machine, specifically a cab allowing a door to be opened and closed in a simple operation and less likely to cause an operator's finger or palm to be pinched when the operator opens and closes the door; and a construction machine including the cab for a construction machine.

Solution to Problem

A cab for a construction machine of the present invention includes a door and a door opening and closing mechanism for opening and closing the door. The door opening and closing mechanism includes a hollow tube and a handle. The hollow tube has a hollow space therein and a hole connecting the hollow space to outside. The handle includes a base portion extending from outside through the hole into the hollow space; and a grip portion located at an end of the base portion on the outside that is opposite to an end of the base portion on the hollow space side. The handle is supported by the hollow tube so as to be movable in a direction in which the handle is pushed toward the hollow space. The hole has a first hole portion located at a portion corresponding to one end of the base portion extending in the longitudinal direction of the hollow tube and a second hole portion extending from the first hole portion to a portion corresponding to the other end of the base portion in the longitudinal direction. A dimension of the grip portion in a width direction orthogonal to the longitudinal direction is greater than a dimension of the base portion in the width direction and greater than a dimension of the second hole portion in the width direction.

According to the cab for a construction machine of the present invention, the handle is supported by the hollow tube so as to be movable in the direction in which the handle is pushed toward the hollow space. Accordingly, the operator can open and close the door in such a simple operation as gripping both of the hollow tube and the handle and pushing the handle into the hollow space.

Furthermore, the dimension of the grip portion in the width direction is greater than the dimension of the base portion in the width direction and greater than the dimension of the second hole portion in the width direction. Accordingly, when the operator grips both of the hollow tube and the handle to push the handle into the hollow space, the operator's finger or palm is less likely to be inserted between the grip portion and the hollow tube because the grip portion has a relatively greater width. Accordingly, the operator's finger or palm is less likely to get caught in a gap between the base portion of the handle and the hole of the hollow tube.

In the above-described cab for a construction machine, a dimension of the first hole portion in the width direction is greater than the dimension of the second hole portion in the width direction.

By setting the dimension of the first hole portion in the width direction to be relatively greater, the gap between a corner portion at one end of the base portion and the first hole portion can be widened in which an operator's finger is more likely to get caught. Thus, it becomes possible to suppress the operator's finger from getting caught in this gap. Furthermore, by setting the dimension of the second hole portion in the width direction to be relatively smaller, the gap in the width direction between the base portion and the second hole portion can be narrowed. Thus, it becomes possible to suppress rattling of the handle against the hollow tube that is caused by a relatively wider gap.

In the above-described cab for a construction machine, the hollow tube is formed of a round pipe.

Accordingly, the operator's finger or palm can readily escape from between the grip portion and the hollow tube along the outer peripheral surface of the hollow tube formed of a round pipe. Therefore, the operator's finger or palm is further less likely to get caught in the gap between the base portion of the handle and the hole of the hollow tube.

In the above-described cab for a construction machine, the dimension of the grip portion in the width direction is smaller than a dimension of the hollow tube in the width direction.

Consequently, the operator can readily grip the handle when holding both of the hollow tube and the handle.

In the above-described cab for a construction machine, in a state where the handle is pushed maximally toward the hollow space, there is a gap between the grip portion and the hollow tube at a portion where the grip portion and the hollow tube are closest to each other.

This prevents the grip portion and the hollow tube from being brought into contact with each other even in the state where the handle is pushed maximally toward the hollow space.

In the above-described cab for a construction machine, a dimension of the base portion in a direction from an end on the hollow space side to an end on the outside is greater than a dimension of the hollow tube in the height direction.

This prevents the grip portion and the hollow tube from being brought into contact with each other even in the state where the handle is pushed maximally toward the hollow space.

In the above-described cab for a construction machine, the base portion is supported by the hollow tube on the other end side in the longitudinal direction so as to be pivotable, and one end of the base portion is inclined so as to be farther away from a pivotal center of the handle as coming closer to the grip portion.

Consequently, even when a finger is put on one end of the base portion to push the handle, the finger put on this one end gradually moves away from the pivotal center along the inclination of the base portion as the handle is pushed into. Since the finger moves so as to escape from the gap between the base portion and the hole extending in the longitudinal direction of the base portion in this way, the finger is less likely to get caught in the gap.

In the above-described cab for a construction machine, the grip portion is provided at one end with an inclined portion formed so as to be farther away from the hollow tube as the inclined portion extends toward the one end from the other end side.

Because of this inclined portion at one end, the operator can recognize the position of his/her index finger with respect to the grip portion of the handle without visual confirmation. Furthermore, when the inclined portion at one end located farthest away from the other end side serving as the pivotal center is pushed toward the hollow space by using an index finger, it becomes possible to operate the handle with relatively less operating force.

A construction machine of the present invention includes the cab for a construction machine described in any of the above.

According to the construction machine of the present invention, the door can be opened and closed in a simple operation, and the operator's finger or palm is less likely to be pinched when the operator opens and closes the door.

Advantageous Effects of Invention

As described above, the present invention can implement a cab for a construction machine, specifically a cab allowing a door to be opened and closed in a simple operation and less likely to cause an operator's finger or palm to be pinched when the operator opens and closes the door; and a construction machine including the cab for a construction machine.

DESCRIPTION OF EMBODIMENTS

The embodiments of the present invention will be hereinafter described with reference to the accompanying drawings.

The configuration of a wheel loader will be first described with reference to FIG. 1 as an example of a construction machine in the first embodiment of the present invention. The present invention is applicable to a construction machine, such as a hydraulic excavator and a bulldozer, provided with a cab having a door opening and closing mechanism.

Figure 1:
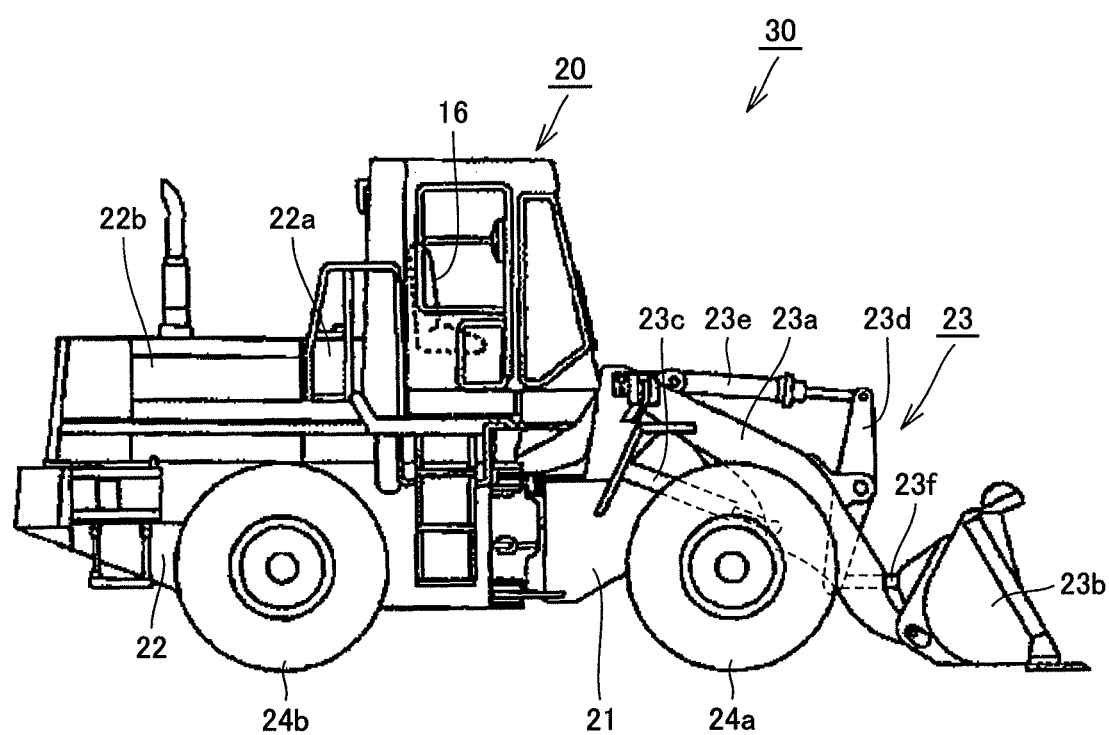
FIG. 1 is a side view schematically showing the configuration of a wheel loader in one embodiment of the present invention.

Referring to FIG. 1, a wheel loader 30 of the present embodiment mainly includes a front frame 21, a rear body 22 and an operating machine 23. To each lateral side of front frame 21, a front wheel 24a is attached. To each lateral side of rear body 22, a rear wheel 24b is attached.

Front frame 21 and rear body 22 are attached to each other by a center pin (not shown) in such a manner that allows them to laterally swing relative to each other, and thus form an articulated structure. Specifically, front frame 21 and rear body 22 are coupled together by a pair of right and left steering cylinders (not shown). The right and left steering cylinders are extended and shortened to allow front frame 21 and rear body 22 to laterally swing relative to each other about the center pin and steer. These front frame 21 and rear body 22 constitute the body of wheel loader 30.

To the front side of front frame 21, operating machine 23 is attached. Operating machine 23 includes a boom 23a having its base end attached to front frame 21 in such a manner that allows boom 23a to swing, and a bucket 23b attached to the leading end of boom 23a in such a manner that allows bucket 23b to swing. Front frame 21 and boom 23a are coupled together by a pair of boom cylinders 23c. The pair of boom cylinders 23c are extended and shortened to allow boom 23a to swing.

Operating machine 23 also includes: a bell crank 23d supported, at a substantially central position of the operating machine, on boom 23a in such a manner that allows bell crank 23d to swing; a bucket cylinder 23e coupling the base end of bell crank 23d and front frame 21 together; and a link 23f coupling the leading end of bell crank 23d and bucket 23b together. Bucket cylinder 23e is extended and shortened to allow bucket 23b to swing.

In a rear portion of rear body 22, an engine room 22b is disposed. On the front side with respect to engine room 22b, a hydraulic oil tank 22a is disposed. A cab 20 is provided on the front side with respect to hydraulic oil tank 22a for accommodating an operator so that the operator in the cab can operate wheel loader 30.

Next, a description will be given, using FIG. 2, of a configuration of a cab 20 for a construction machine according to an embodiment of the present invention, specifically a cab 20 used for wheel loader 30 of FIG. 1.

Figure 2:
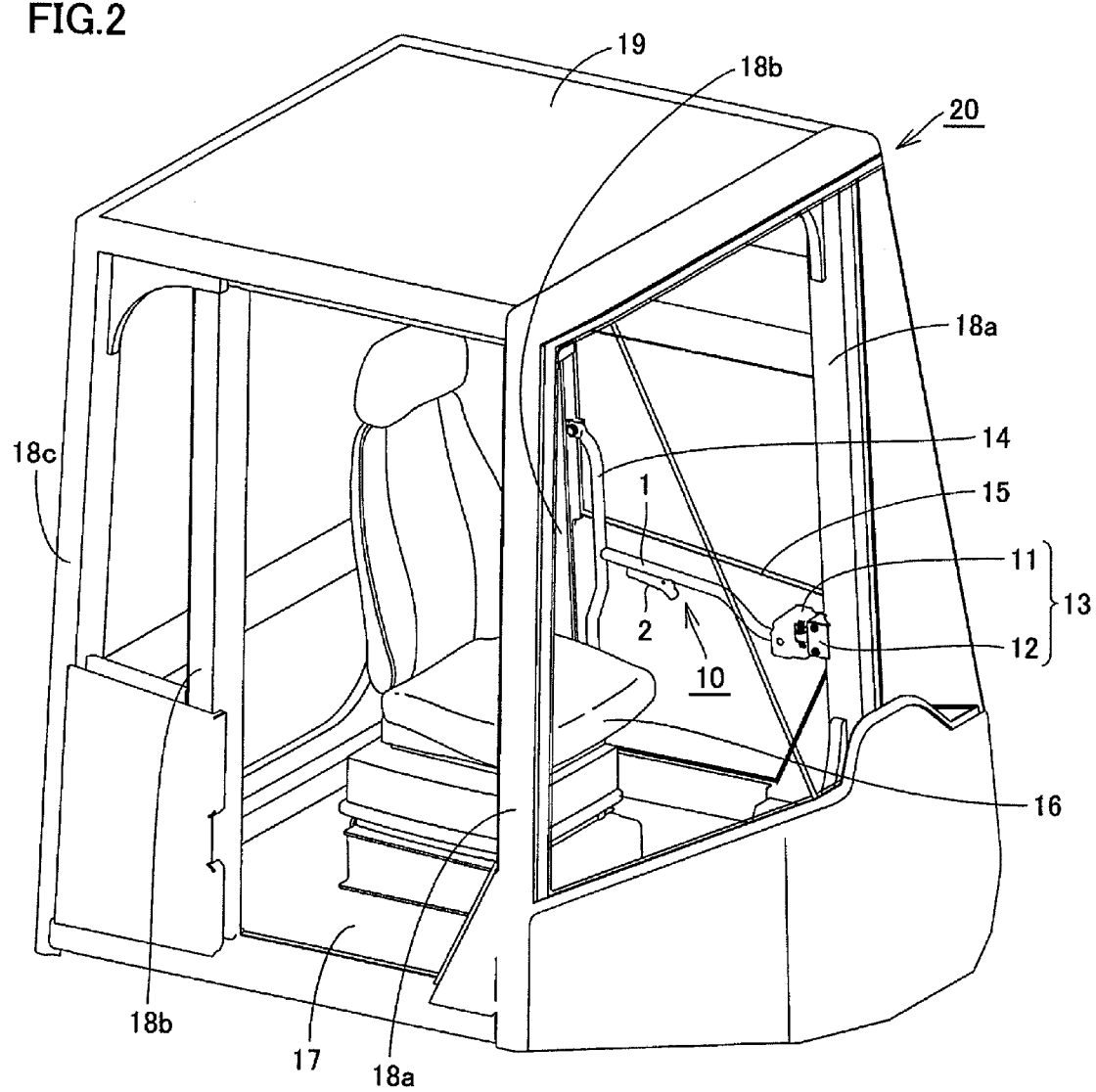
FIG. 2 is a perspective view schematically showing the configuration of a cab of the wheel loader shown in FIG. 1.

Referring to FIG. 2, cab 20 according to the present embodiment mainly includes a door opening and closing mechanism 10, a door 15, a driver's seat 16, a floor plate 17, a pair of front pillars 18a, a pair of center pillars 18b, a pair of rear pillars 18c, and a roof 19.

The pair of front pillars 18a, the pair of center pillars 18b and the pair of rear pillars 18c are vertically arranged on floor plate 17. Each of these pillars 18a, 18b and 18c has an upper end on which roof 19 is supported.

Driver's seat 16 for an operator to sit is disposed in a space surrounded by floor plate 17, each of pillars 18a, 18b and 18c, and roof 19. Door 15 is disposed on the side of driver's seat 16 (in the width direction of the vehicle body) and between front pillar 18a and center pillar 18b. This door 15 is used for an operator to go in and out of cab 20, and attached to cab 20 so as to be openable and closable.

Door opening and closing mechanism 10 for opening and closing door 15 is attached to door 15 and front pillar 18a. Door opening and closing mechanism 10 mainly includes a lock assembly 13 having a catcher 11 and a striker 12, a hollow tube 1, and a handle 2.

Hollow tube 1 has one end connected to catcher 11 and the other end connected to a tube 14 extending in the vertical direction with respect to the vehicle body. This tube 14 is attached to door 15 at both ends. Catcher 11 has a hook (not shown) that can be engaged with a bar member (not shown) of striker 12.

Handle 2 is attached to hollow tube 1. This handle 2 is pushed toward hollow tube 1, thereby allowing disengagement between the hook of catcher 11 and the bar member of striker 12, so that door 15 can be opened.

Then, the attachment structure for the hollow tube and the handle will be hereinafter described with reference to FIGS. 3(A), 3(B) and 4.

Figure 3:
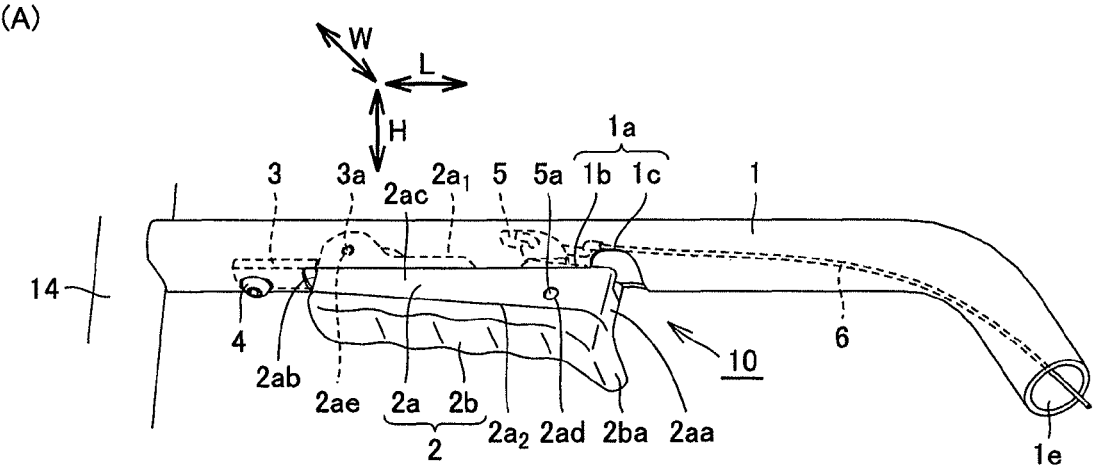
FIG. 3 shows a perspective view (A) and an exploded perspective view (B) each illustrating the enlarged configuration of a door opening and closing mechanism of the cab shown in FIG. 2.
Figure 3:
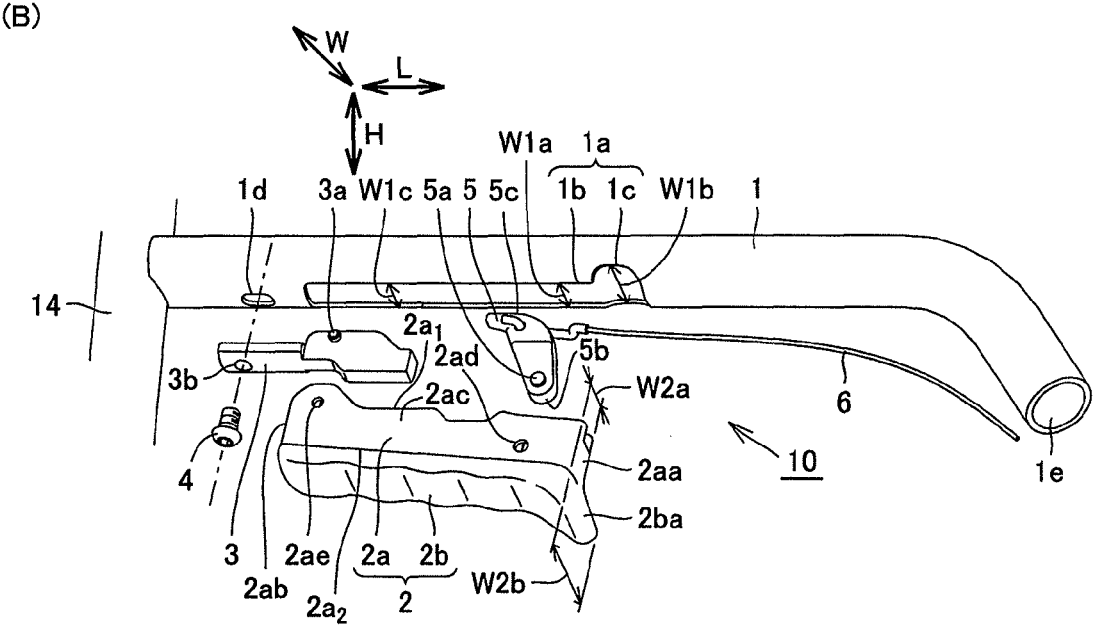

Referring to FIGS. 3(A) and 3(B), the above-mentioned door opening and closing mechanism 10 further includes a fixture 3, a bolt 4, a pivotal portion 5, and a wire 6, in addition to hollow tube 1 and handle 2.

Hollow tube 1 is formed in the shape of a pipe having a hollow space 1e therein and, for example, formed in the shape of a round pipe with a circular cross section. This hollow tube 1 has a hole 1a connecting hollow space 1e to outside.

Handle 2 has a base portion 2a and a grip portion 2b. Base portion 2a and grip portion 2b are integrally formed and, for example, formed integrally by resin molding. Base portion 2a extends from outside of hollow tube 1 through hole 1a into hollow space 1e. This base portion 2a has an end $2a_1$ on the hollow space side and an end $2a_2$ on the outside facing each other in the height direction of handle 2 (in the direction indicated by an arrow H in the figure).

Base portion 2a also has a pair of side surfaces 2ac facing each other in the width direction of the handle (in the direction indicated by an arrow W in the figure). The pair of side surfaces 2ac face each other so as to be in parallel between end $2a_1$ on the hollow space side and end $2a_2$ on the outside.

Base portion 2a extending in the longitudinal direction of hollow tube 1 (in the direction indicated by an arrow L in the figure) has one end 2aa and the other end 2ab, in which a hole 2ad is provided in each of the pair of side surfaces 2ac on the one end 2aa side while a hole 2ae is provided in each of the pair of side surfaces 2ac on the other end 2ab side. In addition, width direction W is orthogonal to longitudinal direction L, and height direction H is orthogonal to both of longitudinal direction L and width direction W.

Grip portion 2b is located at end $2a_2$ on the outside in base portion 2a and brought into contact with the operator's finger when the operator performs a door opening and closing operation. Accordingly, on the surface of grip portion 2b on the side opposite to base portion 2a, a gentle wave-like concavo-convex portion is formed on which four fingers (an index finger, a middle finger, a third finger, and a little finger) are placed. Furthermore, in the forward part of grip portion 2b, an inclined portion is formed such that the more it extends in the forward direction, the farther it is away from hollow tube 1. Consequently, it becomes possible for the operator to recognize the position of his/her finger with respect to grip portion 2b without visually confirming the handle, and also possible to suppress displacement of the above-mentioned four fingers from grip portion 2b during the operation of opening and closing door 15 (FIG. 2).

The above-described handle 2 is supported by hollow tube 1 so as to be movable in the direction in which this handle is pushed at least toward hollow space 1e, and specifically configured as described below.

First, fixture 3 is disposed within hollow space 1e of hollow tube 1. A bolt 4 penetrates through an insertion hole 1d of hollow tube 1, and is screwed into a screw hole 3b of fixture 3. This allows fixture 3 to be fixed by bolt 4 to hollow tube 1 within hollow space 1e.

This fixture 3 has a pair of shafts 3a protruding from each of its lateral sides in the lateral direction. If hollow tube 1 is for example a round pipe, the pair of shafts 3a extend, for example, in the direction parallel to the tangent line of the outer peripheral surface of hollow tube 1 in the state where fixture 3 is attached to hollow tube 1.

Fixture 3 is disposed between the pair of side surfaces 2ac of base portion 2a. Furthermore, the pair of shafts 3a are inserted into the pair of holes 2ae, respectively, of base portion 2a, and arranged so as to extend in the width direction W of handle 2. Accordingly, handle 2 is pivotable about the pair of shafts 3a with respect to hollow tube 1 and supported by hollow tube 1 so as to be movable in the direction in which handle 2 is pushed toward hollow space 1e and in the direction opposite thereto.

Furthermore, the above-described handle 2 is configured such that it can operate, for example, to pull wire 6 connected to catcher 11 (FIG. 2) by the above-described moving operation (for example, a pivotal movement operation), as will be specifically described below.

First, pivotal portion 5 is disposed between the pair of side surfaces 2ac of base portion 2a. Pivotal portion 5 is provided on its one end 5b side with a pair of shafts 5a protruding from each lateral side of this pivotal portion 5 in the lateral direction. The pair of shafts 5a are inserted into the pair of holes 2ad, respectively, of base portion 2a, and arranged to extend in the width direction W of handle 2. Accordingly, pivotal portion 5 is pivotable about the pair of shafts 5a with respect to handle 2.

Wire 6 is attached to this pivotal portion 5 on its other end 5c side, and extends through hollow space 1e of hollow tube 1 to catcher 11 (FIG. 2). This pivotal portion 5 pivots with respect to handle 2, thereby allowing such an operation as pulling wire 6, and the like.

Then, the shape of hole 1a, a dimension of each part and the like will be described with reference to FIG. 4.

Figure 4:
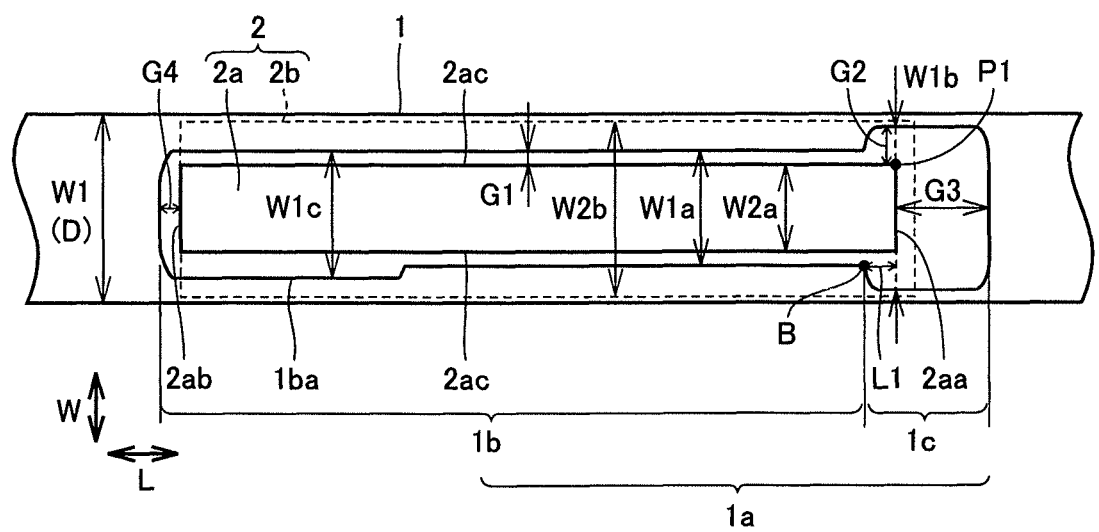
FIG. 4 is a diagram for illustrating dimensions of a hole of a hollow tube and a base portion and a grip portion of a handle in the door opening and closing mechanism of the cab shown in FIG. 2.

Referring to FIG. 4, hole 1a has a first hole portion 1c and a second hole portion 1b. First hole portion 1c is located at one end 2aa of base portion 2a extending in the longitudinal direction L of hollow tube 1. Second hole portion 1b is located to extend from one end of this first hole portion 1c toward the portion corresponding to the other end 2ab of base portion 2a.

A dimension W2b of grip portion 2b of handle 2 in the width direction W is greater than a dimension W2a of base portion 2a in the width direction W and greater than a dimension W1a of second hole portion 1b in the width direction W.

Furthermore, a dimension W1b of first hole portion 1c in the width direction W is greater than dimension W1a of second hole portion 1b in the width direction W. Accordingly, a dimension G2 in the width direction W of a gap between a corner portion P1 at one end 2aa of base portion 2a and first hole portion 1c is greater than a dimension G1 in the width direction W of a gap between a side surface 2ac of base portion 2a and second hole portion 1b. Furthermore, a dimension W2b of grip portion 2b in the width direction W is smaller than a dimension W1 (for example, a diameter D) of hollow tube 1 in the width direction W. It is to be noted that a boundary B between first hole portion 1c and second hole portion 1b is located closer to the other end 2ab of base portion 2a by a prescribed length L1 from one end 2aa thereof. It is preferable that dimension W2b is equal to or greater than dimension W1b.

Furthermore, a dimension G3 in the longitudinal direction L of the gap between one end 2aa of base portions 2a and the end of first hole portion 1c on the side opposite to the other end 2ab is greater than a dimension G4 in the longitudinal direction L of the gap between the other end 2ab of base portion 2a and the end of second hole portion 1b on the side opposite to one end 2aa. Insertion hole 1d as mentioned above is a long hole. Accordingly, even if the position of the handle is adjusted backward and forward (in the L direction), dimension G3 in the longitudinal direction L of the gap between one end 2aa of base portions 2a and the end of first hole portion 1c on the side opposite to the other end 2ab can be maintained at a prescribed gap.

Furthermore, on the other end side of second hole portion 1b in the longitudinal direction L, a wide-width portion 1ba increased in width of second hole portion 1b may be formed. Accordingly, a dimension W1c in the width direction W of second hole portion 1b in which wide-width portion 1ba is formed is greater than a dimension W1a in the width direction W of second hole portion 1b in which wide-width portion 1ba is not formed. By providing this wide-width portion 1ba, handle 2 can be readily installed in hollow tube 1.

Next, the operation of door opening and closing mechanism 10 in the present embodiment will be described with reference to FIGS. 5(A) and 5(B).

Figure 5:
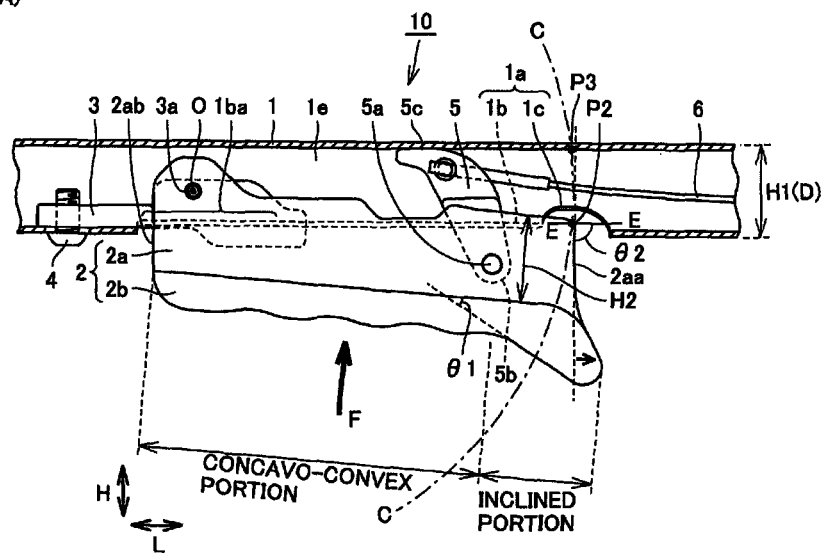
FIG. 5 is a diagram showing the operation of the door opening and closing mechanism of the cab shown in FIG. 2, including a partially cutaway side view (A) showing the state before the handle is pushed into the hollow space and a partially cutaway side view (B) showing the state where the handle has been pushed into the hollow space.
Figure 5:
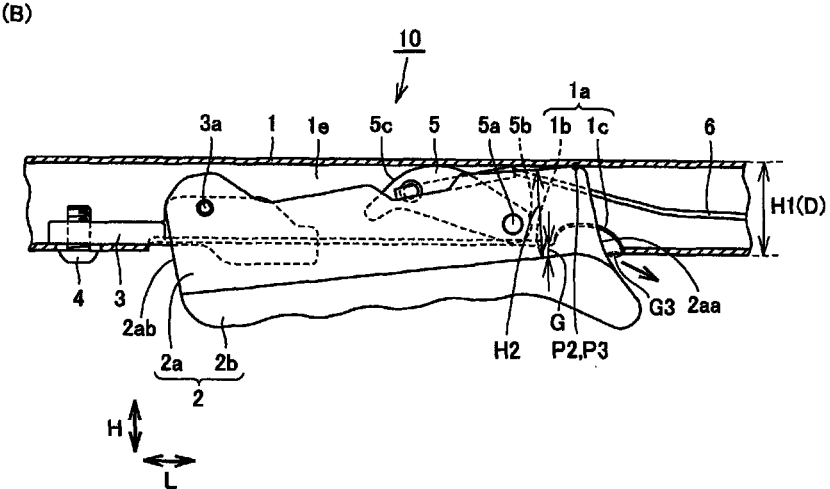

Referring to FIG. 5(A), in the state before handle 2 is pushed toward hollow space 1e of hollow tube 1, handle 2 is not in contact with the inner peripheral surface of hollow tube 1. In other words, a portion P2 at one end 2aa of base portion 2a located closest to hollow space 1e is spaced apart from a portion P3 on the inner peripheral surface of hollow tube 1 that intersects the pivotal movement path (an alternate long and short dashed line C-C) of this portion P2. Also in this state, the other end 5c of pivotal portion 5 is in contact with the inner peripheral surface of hollow tube 1.

When an operator grips both of hollow tube 1 and handle 2 in this state, handle 2 is applied with force in the direction indicated by an arrow F in the figure. By this force applied in the direction F, handle 2 pivots about shafts 3a as center O in the direction in which handle 2 is pushed toward hollow space 1e of hollow tube 1.

Referring to FIG. 5(B), by the above-described operation, handle 2 pivots until portion P2 of base portion 2a is brought into contact with portion P3 on the inner peripheral surface of hollow tube 1. In this case, pivotal portion 5 pivots about shafts 5a with respect to handle 2. By this pivotal movement of pivotal portion 5, the other end 5c of pivotal portion 5 slides toward the other end 2ab in the longitudinal direction L (to the left in the figure) while being kept in contact with the inner peripheral surface of hollow tube 1. Thereby, wire 6 attached to pivotal portion 5 on the other end 5c side is pulled toward the other end 2ab in the longitudinal direction L. This allows disengagement between the hook of catcher 11 the bar member of striker 12 that are shown in FIG. 2, so that door 15 can be opened.

The preferable configuration of door opening and closing mechanism 10 in the present embodiment will then be described with reference to FIGS. 5(A) and 5(B).

Referring to FIG. 5(B), handle 2 is configured such that, in the state where handle 2 is pushed maximally toward hollow space 1e, a gap G occurs between grip portion 2b and hollow tube 1 at the portion where grip portion 2b and hollow tube 1 come closest to each other. Furthermore, handle 2 is configured such that a gap G3 occurs also in front of the front end of handle 2 in the state where handle 2 is pushed maximally toward hollow space 1e.

Referring to FIG. 5(A), in order to produce the above-mentioned gap G, specifically, a height H2 of base portion 2a at a portion where grip portion 2b and hollow tube 1 come closest to each other (a dimension H2 of base portion 2a from the end on the hollow space 1e side to the end on the outside of hollow tube 1) is greater than a dimension H1 of hollow tube 1 in the height direction H (for example, diameter D).

One end 2aa of base portion 2a is inclined so as to be farther away from the pivotal center O of handle 2 (shafts 3a) as coming closer to grip portion 2b. Specifically, it is assumed that an imaginary curve C-C extends at a distance from pivotal center O, which is equal to the distance from pivotal center O to portion P2 at one end 2aa of base portion 2a that is located closest to hollow space 1e. In this case, one end 2aa of base portion 2a is inclined so as to be farther away from this imaginary curve C-C in the radial direction around pivotal center O as coming closer to grip portion 2b from the above-mentioned portion P2.

Furthermore, in the state before handle 2 is pushed toward hollow space 1e, one end 2aa of base portion 2a is preferably inclined at an angle θ2 of less than 90° with respect to an imaginary straight line E-E extending in the longitudinal direction L.

Grip portion 2b also has an inclined portion located on base portion 2a on the one end 2aa side and a concavo-convex portion located on base portion 2a on the other end 2ab side. This inclined portion is inclined so as to be farther away from hollow tube 1 as coming closer to one end 2aa of base portion 2a in the longitudinal direction L from the other end 2ab side. This inclined portion is inclined at an angle θ1 of less than 90° with respect to the boundary between base portion 2a and the concavo-convex portion of grip portion 2b.

The functions and effects of the present embodiment will then be described.

Figure 6:
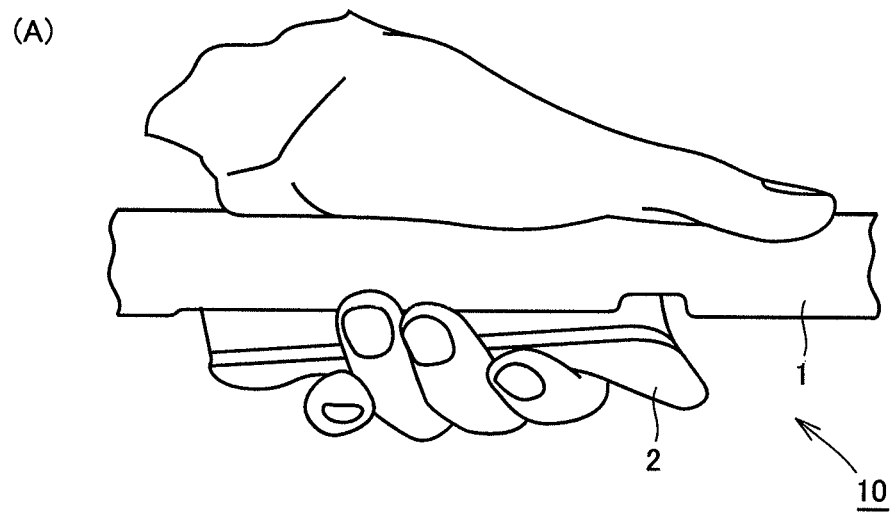
FIG. 6 is a diagram showing the state where an operator operates the door opening and closing mechanism of the cab shown in FIG. 2, including a side view (A) showing the state where an index finger is put on a grip portion of the handle during the operation, a side view (B) showing the state where an index finger is put on one end of the base portion during the operation, and a cross-sectional view (C) showing the state during the operation.
Figure 6:
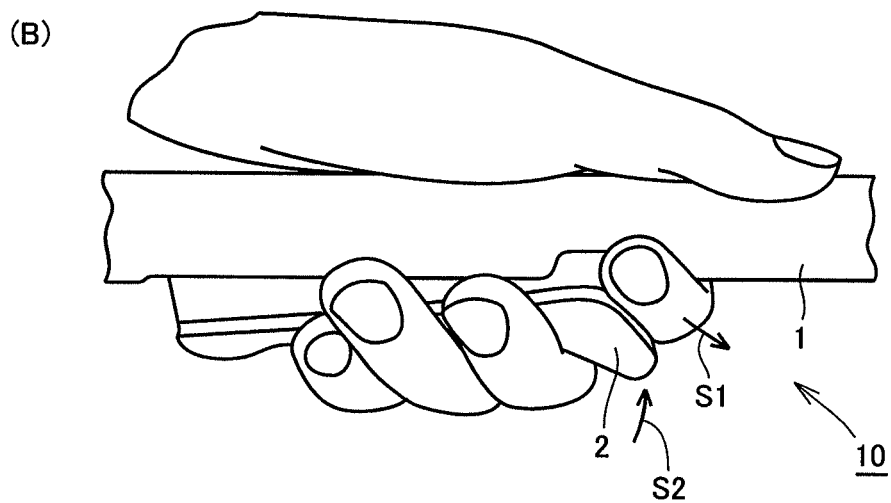
Figure 6:
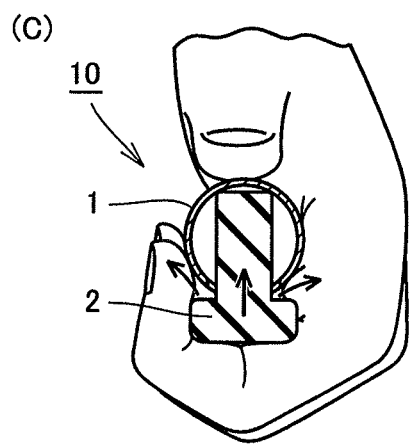

According to the present embodiment, as shown in FIGS. 5(A) and 5(B), handle 2 is supported by hollow tube 1 so as to be movable in the direction in which handle 2 is pushed toward hollow space 1e. Thereby, the operator can open and close door 15 in such a simple operation as holding both of hollow tube 1 and handle 2, and pushing handle 2 into hollow space 1e as shown in FIG. 6(A) or 6(B).

Furthermore, as shown in FIG. 4, dimension W2b of grip portion 2b in the width direction W is greater than dimension W2a of base portion 2a in the width direction W and greater than dimension W1a of second hole portion 1b in the width direction W. Accordingly, when the operator grips both of hollow tube 1 and handle 2 to push handle 2 into hollow space 1e as shown in FIG. 6(C), the operator's finger or palm is less likely to be inserted between grip portion 2b and hollow tube 1 because grip portion 2b has relatively greater width W2b. Consequently, the operator's finger or palm is less likely to get caught in the gap between base portion 2a of handle 2 and hole 1a of hollow tube 1.

Also as shown in FIG. 4, dimension W1b of first hole portion 1c in the width direction W is greater than dimension W1a of second hole portion 1b in the width direction W. In this way, dimension W1b of first hole portion 1c in the width direction W is set relatively greater, thereby allowing an increase in dimension G2 in the width direction W of the gap between corner portion P1 of base portion 2a at one end 2aa and first hole portion 1c in which the operator's finger is more likely to get caught. Consequently, it becomes possible to suppress the operator's finger from getting caught in this portion. Furthermore, dimension W1a of second hole portion 1b in the width direction W is set relatively smaller, thereby allowing a decrease in dimension G1 in the width direction W of the gap between base portion 2a and second hole portion 1b. Consequently, rattling of handle 2 against hollow tube 1 can be suppressed.

Furthermore, as shown in FIGS. 3(A), 3(B) and the like, hollow tube 1 is formed of a round pipe. Accordingly, when an operator grips both of hollow tube 1 and handle 2 as shown in FIG. 6(C), the operator's finger or palm can readily escape from between grip portion 2b and hollow tube 1 along the outer peripheral surface of hollow tube 1 formed of a round pipe, as indicated by an arrow in the figure. Thereby, the operator's finger or palm is further less likely to get caught in the gap between base portion 2a of handle 2 and hole 1a of hollow tube 1.

Also as shown in FIG. 4, dimension W2b of grip portion 2b in the width direction W is smaller than dimension W1 of hollow tube 1 in the width direction W. Accordingly, when the operator holds both of hollow tube 1 and handle 2 as shown in FIGS. 6(A), 6(B) and 6(C), the operator can easily grip handle 2.

Furthermore, in the state where handle 2 is pushed maximally toward hollow space 1e as shown in FIG. 5(B), there is a gap G between grip portion 2b and hollow tube 1 at the portion where grip portion 2b and hollow tube 1 come closest to each other. This prevents grip portion 2b and hollow tube 1 from being brought into contact with each other even in the state where handle 2 is pushed maximally toward hollow space 1e. Furthermore, handle 2 is configured such that gap G3 occurs also in front of the front end of handle 2 in the state where handle 2 is pushed maximally into hollow space 1e.

Also, as shown in FIG. 5(A), height H2 of base portion 2a from the end on the hollow space 1e side to the end on the outside of hollow space 1e is greater than dimension H1 of hollow tube 1 in the height direction H (for example, diameter D). This prevents grip portion 2b and hollow tube 1 from being brought into contact with each other even in the state where handle 2 is pushed maximally toward hollow space 1e.

Also as shown in FIG. 5(A), base portion 2a is supported by hollow tube 1 on the other end 2ab side in the longitudinal direction L so as to be pivotable, and one end 2aa of base portion 2a is inclined so as to be farther away from pivotal center O of handle 2 as coming closer to grip portion 2b. Accordingly, even when the finger (an index finger) is put on one end 2aa of base portion 2a to push handle 2 in the direction indicated by an arrow S2 in the figure as shown in FIG. 6(B), the more handle 2 is pushed into, the more the finger put on one end 2aa of this handle 2 is moved away from the pivotal center along the inclination of one end 2aa of base portion 2a in the direction indicated by an arrow S1 in the figure. In this way, since the finger moves so as to escape from the gap between base portion 2a and a hole of hollow tube 1 extending in the longitudinal direction L of base portion 2a, the finger is less likely to get caught in the gap.

Furthermore, as shown in FIG. 5(A), grip portion 2b is provided at one end with an inclined portion formed so as to be farther away from hollow tube 1 as it extends toward one end 2aa from the other end 2ab side. Because of this inclined portion provided at one end, the operator can recognize the position of his/her index finger with respect to grip portion 2b of handle 2 without visual confirmation. Furthermore, when the inclined portion at one end located farthest away from the other end serving as pivotal center O is pushed toward the hollow space by using an index finger, it becomes possible to operate the handle with relatively less operating force.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 hollow tube, 1a hole, 1b second hole portion, 1ba wide-width portion, 1c first hole portion, 1d insertion hole, 1e hollow space, 2 handle, 2a base portion, $2a_1$ end on the hollow space side, $2a_2$ end on the outside, 2aa, 5b one end, 2ab, 5c the other end, 2ad, 2ae hole, 2b grip portion, 3 fixture, 3a, 5a shaft, 3b screw hole, 4 bolt, 5 pivotal portion, 6 wire, 10 opening and closing mechanism, 11 catcher, 12 striker, 13 lock assembly, 14 tube, 15 door, 16 driver's seat, 17 floor plate, 18a front pillar, 18b center pillar, 18c rear pillar, 19 roof, 20 cab for a construction machine, 21 front frame, 22 rear body, 22a hydraulic oil tank, 22b engine room, 23 operating machine, 23a boom, 23b bucket, 23c boom cylinder, 23d bell crank, 23e bucket cylinder, 23f link, 24a front wheel, 24b rear wheel 30 wheel loader.

The invention claimed is:

1. A can for a construction machine, said cab comprising a door and a door opening and closing mechanism for opening and closing said door, said door opening and closing mechanism including a hollow tube having a hollow space therein and having a hole connecting said hollow space to outside of said hollow tube, and a handle having a base portion extending from said outside of said hollow tube through said hole into said hollow space, and a grip portion located at an end of said base portion on said outside of said hollow tube that is opposite to an end of said base portion on a side located within said hollow space, said handle being supported by said hollow tube, said base portion and said grip portion are movable in a direction in which said handle is pushed toward said hollow space, said hole having a first hole portion extending in a longitudinal direction of said hollow tube and a second hole portion extending from said first hole portion in said longitudinal direction and having a first section and a second section, and an outer dimension of said grip portion in a width direction orthogonal to said longitudinal direction being greater than an outer dimension of said base portion in said width direction and greater than a dimension of the first section of said second hole portion in said width direction, wherein said base portion comprises one terminal end and another terminal end that define a length dimension of said base portion along said longitudinal direction, wherein said one terminal end of said base portion is disposed in said first hole portion and said other terminal end of said base portion is disposed in said first section of said second hole portion, wherein a dimension of said first section of said second hole portion in said width direction is greater than a dimension of said second section of said second hole portion in said width direction, and wherein a dimension of said first hole portion in said width direction is greater than the dimensions of said first and second sections of said second hole portion in said width direction.

2. The cab for a construction machine according to claim 1, wherein said hollow tube is formed of a round pipe.

3. The cab for a construction machine according to claim 1, wherein the outer dimension of said grip portion in said width direction is smaller than a dimension of said hollow tube in said width direction.

4. The cab for a construction machine according to claim 1, wherein, in a state where said handle is pushed maximally toward said hollow space, there is a gap between said grip portion and said hollow tube at a portion where said grip portion and said hollow tube are closest to each other.

5. The cab for a construction machine according to claim 1, wherein a dimension of said base portion in a height direction from the end of the base portion on said side located within said hollow space to the end of said base portion on said outside of said hollow tube is greater than a dimension of said hollow tube in said height direction.

6. The cab for a construction machine according to claim 1, wherein said base portion is supported by said hollow tube at the other terminal end in said longitudinal direction by a shaft, and said one terminal end of said base portion is inclined away from the shaft toward said grip portion.

7. The cab for a construction machine according to claim 1, wherein said grip portion is provided at said one terminal end with an inclined portion formed so as to be farther away from said hollow tube as the inclined portion extends toward said one terminal end from said other terminal end.

8. A construction machine comprising said cab for a construction machine according to claim 1.

\* \* \* \* \*

UNITED STATES PATENT AND TRADEMARK OFFICE
CERTIFICATE OF CORRECTION

| | | |
|---|---|---|
| PATENT NO. | : 9,221,319 B2 | Page 1 of 1 |
| APPLICATION NO. | : 14/003328 | |
| DATED | : December 29, 2015 | |
| INVENTOR(S) | : Yasunari Kato | |

It is certified that error appears in the above-identified patent and that said Letters Patent is hereby corrected as shown below:

In claim 1, column 10, line 34 of the above identified patent, change "can" to --cab--

Signed and Sealed this
Twenty-sixth Day of April, 2016

Michelle K. Lee
*Director of the United States Patent and Trademark Office*